United States Patent
Bodnar et al.

(10) Patent No.: US 6,263,634 B1
(45) Date of Patent: Jul. 24, 2001

(54) GROMMET FOR USE WITH SHEET METAL STRUCTURAL MEMBER

(75) Inventors: Ernest R. Bodnar, Toronto; Ronald J. Bogart, Aurora; John P. Lamers, Ingersoll, all of (CA)

(73) Assignee: Rotary Press Systems Inc., Richmond Hill (CA)

( * ) Notice: Subject to any disclaimer, the term of this patent is extended or adjusted under 35 U.S.C. 154(b) by 0 days.

(21) Appl. No.: 09/405,098

(22) Filed: Sep. 27, 1999

(51) Int. Cl.[7] .................................. E04C 3/30; F16L 5/00
(52) U.S. Cl. ........................ 52/731.1; 16/2.1; 174/153 G
(58) Field of Search .......................... 52/731.1, 731.7, 52/731.9, 220.1, 220.8, 634, 636, 646; 16/2.1, 2.2; 312/223.3, 223.6; 174/153 G

(56) References Cited

U.S. PATENT DOCUMENTS

| | | | |
|---|---|---|---|
| 2,145,407 | * 1/1939 | Soule | 52/731.1 X |
| 2,912,712 | * 11/1959 | Shamban et al. | 16/2.1 |
| 3,372,441 | * 3/1968 | Fisher | 16/2.1 |
| 4,050,205 | * 9/1977 | Ligda | 52/220.1 X |
| 4,928,349 | 5/1990 | Oikawa et al. | 16/2 |
| 5,527,625 | * 6/1996 | Bodnar | 52/634 X |
| 5,625,997 | * 5/1997 | Callahan et al. | 52/731.1 X |
| 5,687,538 | * 11/1997 | Frobosilo et al. | 52/731.1 X |
| 5,736,677 | 4/1998 | Sato et al. | 174/65 G |
| 5,739,475 | 4/1998 | Fujisawa et al. | 174/153 G |
| 5,806,139 | * 9/1998 | Anderson et al. | 16/2.1 |
| 5,836,212 | 11/1998 | Bates | 74/502.6 |

FOREIGN PATENT DOCUMENTS 0 580 130 A1    1/1994   (EP) .

* cited by examiner

*Primary Examiner*—Peter M. Cuomo
*Assistant Examiner*—James O. Hansen

(57) ABSTRACT

A Sheet Metal Structural Member has flanged openings formed therein to permit the passage of services therethrough. A grommet is provided that has a shape that corresponds generally to the plan form shape of the openings. The grommet has a peripheal wall and seating elements arranged about the peripheral wall to mate with the flanges that are located about the flanged opening. The grommet snaps into place and resists movement once installed. The grommet has radiused edges to discourgae damage to service conduits or wiring carried therethrough.

47 Claims, 9 Drawing Sheets

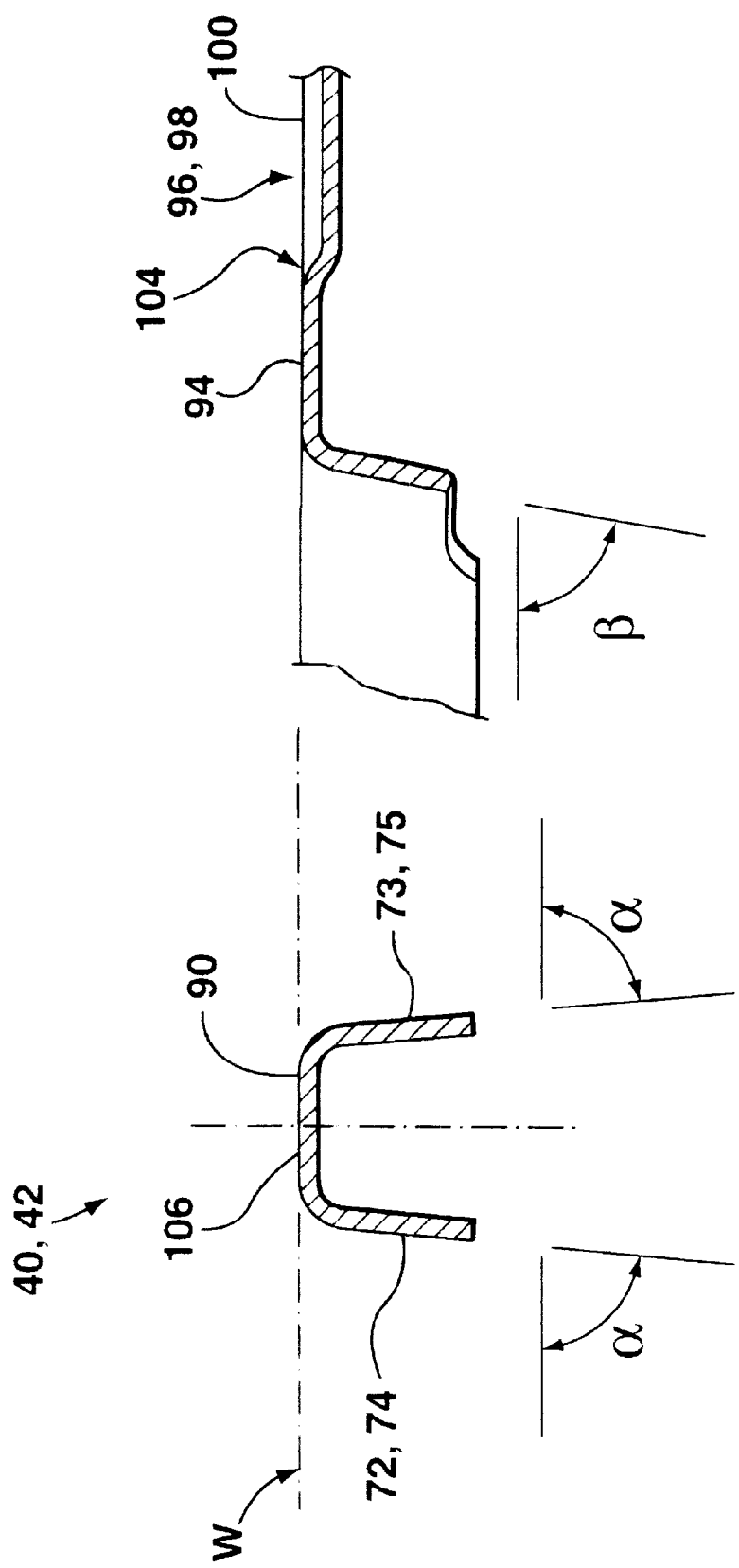

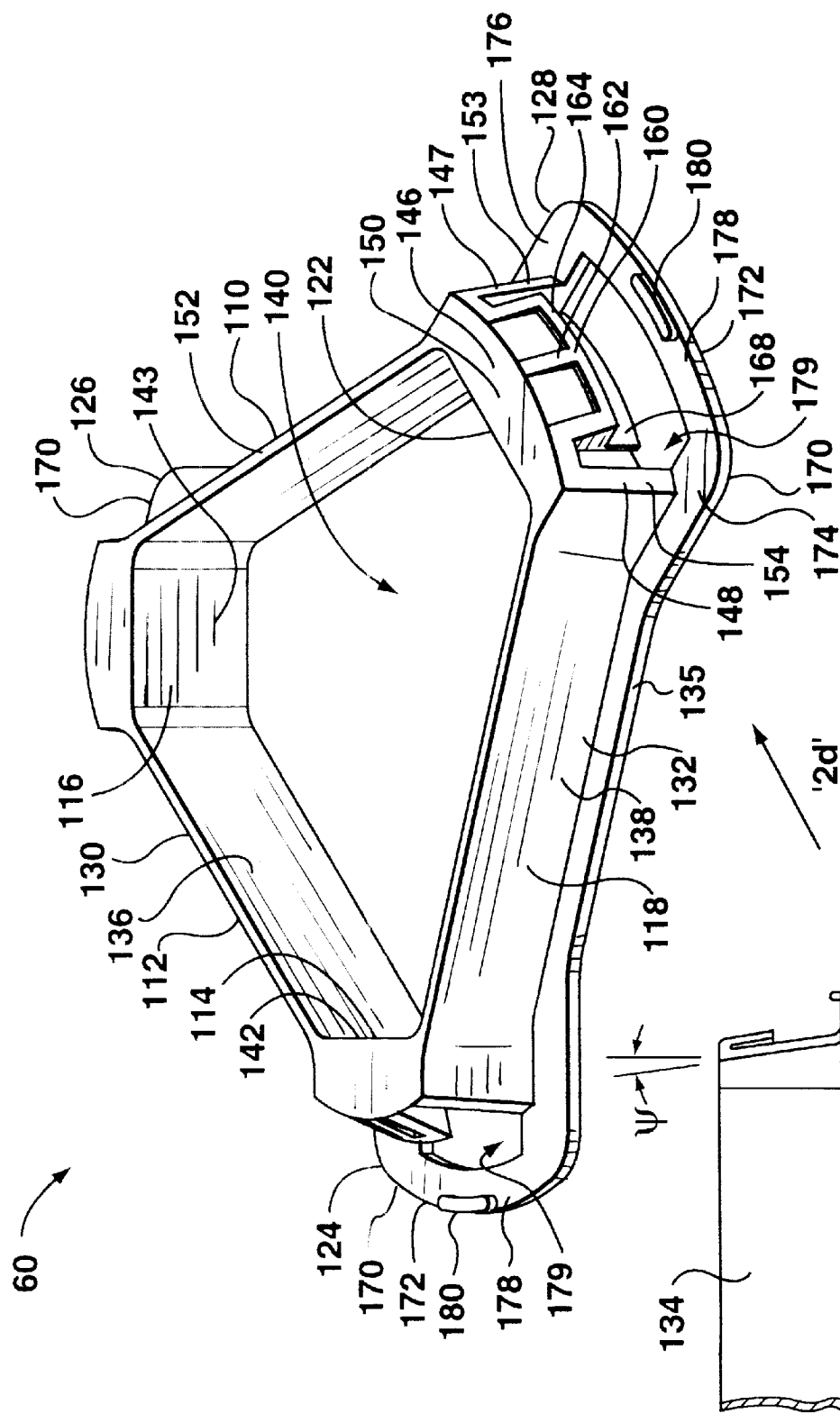
FIG. 2a
FIG. 2d

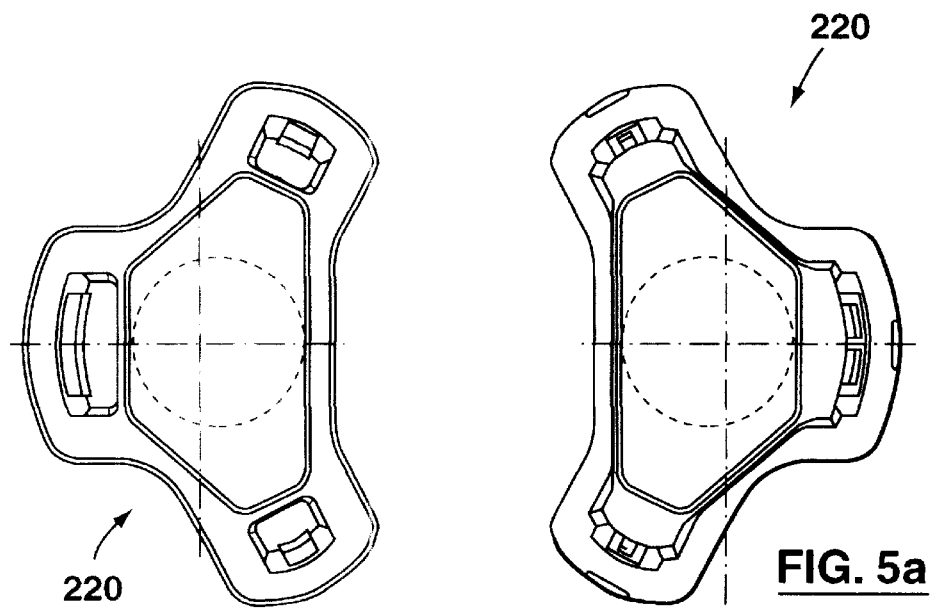
FIG. 5b  FIG. 5a
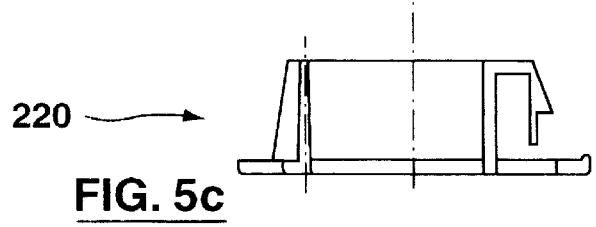
FIG. 5c
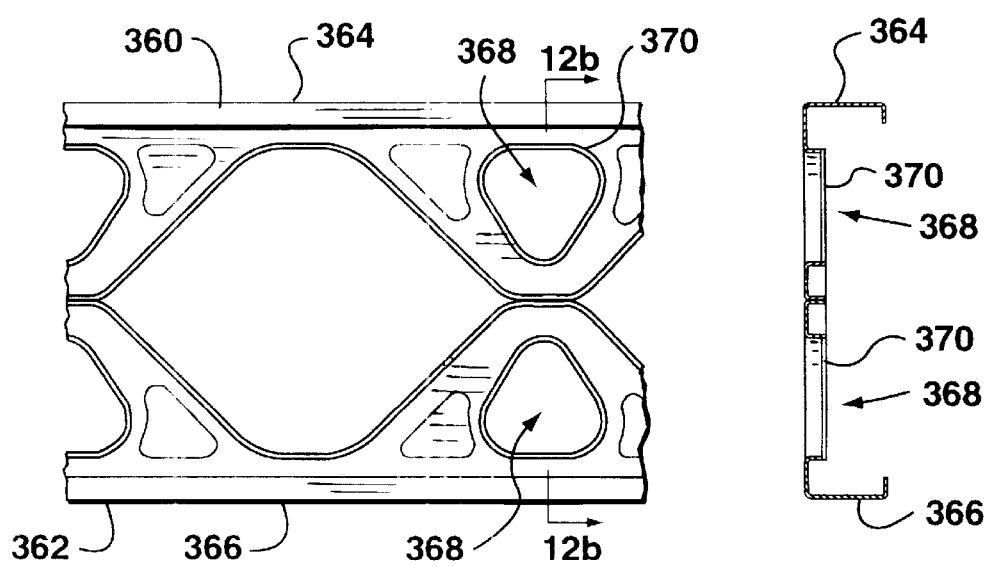
FIG. 12a  FIG. 12b

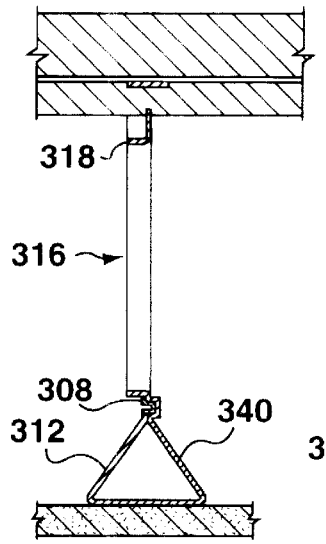
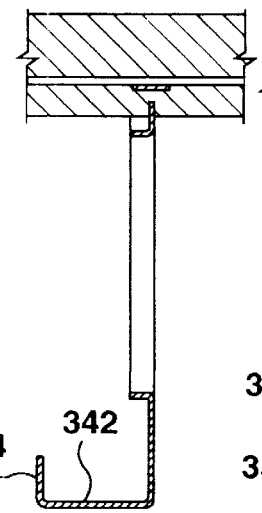
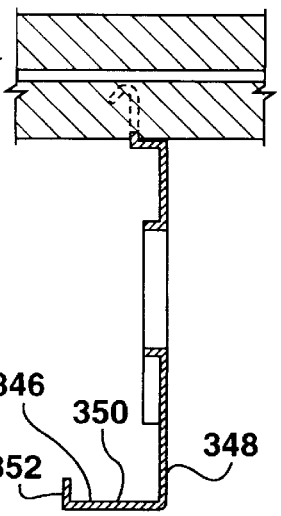
FIG. 11a  FIG. 11b  FIG. 11c
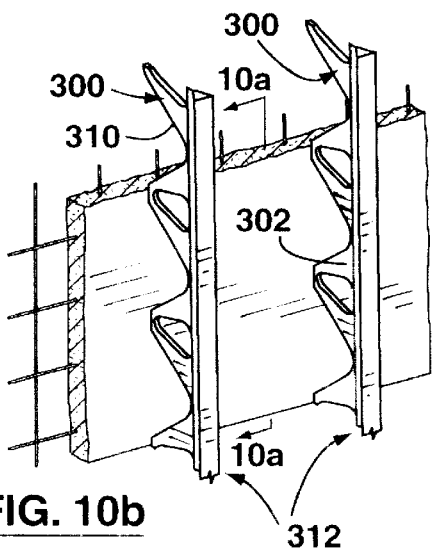
FIG. 10b
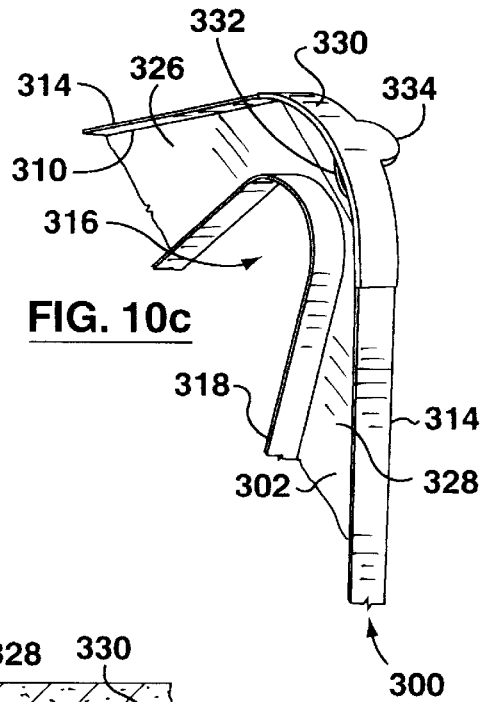
FIG. 10c
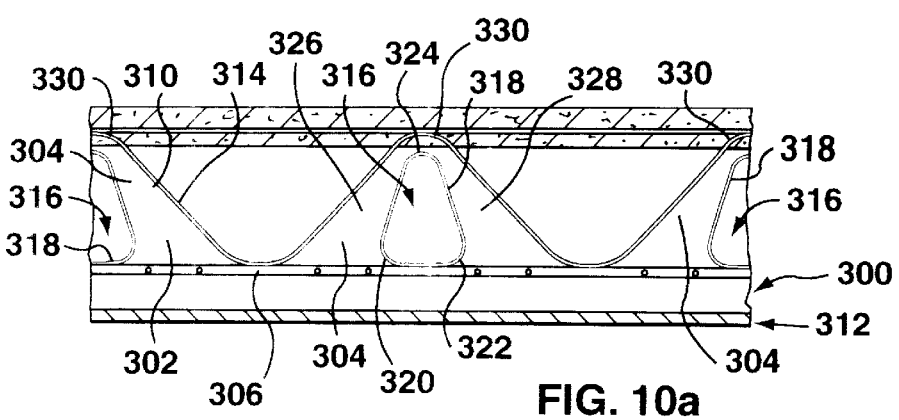
FIG. 10a

GROMMET FOR USE WITH SHEET METAL STRUCTURAL MEMBER

FIELD OF INVENTION

This invention relates to the field of grommets, and, in particular to a grommet that is mountable in a formed aperture in a web section of a formed metal structural member, and a combination of the grommet with a structural member.

BACKGROUND ART

It is possible to manufacture formed sheet metal posts and beams that can be used as an alternative building material to wooden studs, rafters, stringers, and beams that have been commonly used. It is advantageous to produce such structural members in a manner that may tend to enhance their strength-to-weight ratio, while also tending to reduce the heat loss that may occur across the section of the structural member. As shown in U.S. Pat. No. 5,527,625 of Bodnar, issued Jun. 18, 1996, one way to address these objective is to provide a roll-formed metal member having a web and a pair of opposed flanges, in a generally C-shaped channel-like section, and then to blank the web to leave alternating diagonal struts with formed flanges such that the remaining web has a somewhat truss-like appearance when viewed perpendicular to the web.

The manner in which the openings are formed through the web of the structural member, and the manner of forming the flanges, is such that it is advantageous to provide a relatively smoothly radiused transition into the web adjacent to the opposed out-of-plane flanges.

In a conventional wooden stud or rafter, services, such as electrical power wiring, plumbing, telephone or other communications wiring, or built-in vacuum lines, may tend to be carried though holes bored in the mid-section of the stud or rafter. Wooden studs tend not to be good electrical conductors, and may tend to dampen vibration. In most cases services can be mounted directly in contact with the wood. It is not desirable to have holes bored in sheet metal structural members on the job site, since this is a process over which there is very little quality control, and hence significant opportunity to impair the structural performance of the section. Furthermore, in a formed sheet metal structural member that has had openings blanked in it, and flanged struts formed in it adjacent to the openings, there may be little or no need to drill additional openings.

However, while it would be possible to run services directly through the openings formed in the web, it may also be undesirable. The formed metal member may have sharp edges, and it may tend not to be practical to have all of those edges smoothed down. It may not be desirable to have electrical wiring chafe against a sharp metal edge over a period of time, under vibration loads. Similarly, it may not be desirable to run water pipes, whether hot or cold, in direct contact with the metal section. For these reasons an intermediate isolating or cushioning member may be desired.

A cushioning member, or grommet, for use with the formed sheet metal structural member has a number of desirable properties. In a construction project such a grommet may be required at one or more formed openings in every stud in a wall, and in one or more walls in every room in a house or other building. The person installing the grommets may do so many times per day. An installation that requires complicated tools or procedures is unlikely to be one that will be undertaken with a high level of diligence on a repetitive basis, particularly as the installer grows weary or disinterested.

While it is advantageous for the grommet to be easily installed, it is also desirable that the grommet not tend to be too easily removed. The grommet may be required to stay in service for many years. A loose fit may not be desirable, particularly if vibration is a concern, as it may be in a water pipe fitting, or a fitting subject to repetitive loading over a relatively long period of time.

In the type of sheet metal structural member in question, the depth of the strut flanges may tend to be greatest at mid strut, and may tend to be reduced in the radiused corners where the struts meld into the margin of the web that adjoins the flanges. The dimensional control over the distance from strut to strut may tend to be poorest at mid strut, and relatively greater in the corners of the opening adjacent to the web margin. The web margin may also tend to be a region of lesser potential for deflection due to vibration than the mid strut region. It is advantageous to have an insulating grommet that is capable of engaging the root corners of the formed opening.

It is advantageous to produce a family of grommets of the same, or similar, base width dimension, each having a different attitude for use with a different width of structural member, rather than using the same longitudinal base to cross-web altitude aspect ratio. The use of the same aspect ratio grommet at different sizes would correspond to structural members having greater pitch centers between adjacent openings. When using a rotary press with interchangeable dies, the pitch center distance is determined by the fixed radius of the successive pivot axes of the rotary dies carriers and seats. Since it is difficult to change this dimension it is advantageous to change the height of the openings transverse to the web, while maintaining the pitch between openings at a constant distance.

SUMMARY OF THE INVENTION

In one aspect of the present invention there is a grommet, for use with a structural member having a web and an opening defined in the web. The opening has flangework adjacent the opening. The grommet is insertable into the opening when moved forwardly along an insertion direction. The grommet comprises a peripheral wall defining a passageway therewithin. The wall has a leading portion for insertion into the opening and a trailing portion; and at least two seating elements extending outwardly from the trailing portion of the wall to prevent the trailing portion from passing through the opening. The grommet has at least two abutments connected to the peripheral wall. The abutments are moveable to a deflected position to permit entry of the leading portion into the opening, and the abutments are biased outwardly relative to the peripheral wall to an opposed position relative to the seating elements. The seating elements are spaced from the abutments in the insertion direction to permit the web flangework to be captured therebetween. The abutments and the seating elements are spaced about the peripheral wall to inhibit forward and rearward motion of the grommet relative to the structural member in the insertion direction when the abutments are in the opposed position.

In an additional feature of that aspect of the invention, at least one of the seating elements is resilient. The grommet is moveable to an inserted position relative to the structural member. In the inserted position the abutments are able to move to the opposed position and the resilient seating element is pre-loaded. The pre-loaded resilient seating element is operable to exert a rearward force on the abutments.

In another additional feature of that aspect of the invention, at least one of the seating elements is resilient and has a distal tip region that is cantilevered outwardly from the peripheral wall. The distal tip region has a forwardly protruding formation thereon. The grommet is moveable to an inserted position relative to the structural member. In the inserted position the abutments are able to move to the opposed position and the forwardly protruding formation is engageable with the structural member to cause the distal tip region to deflect rearwardly relative to the peripheral wall, thereby applying a pre-load to the resilient seating element. The pre-loaded resilient seating element is operable to exert a rearward force on the abutments, thereby squeezing the structural member between the abutments and the seating elements.

In a further additional feature of that aspect of the invention, the seating elements include flanges cantilevered out from the peripheral wall. The flanges have a rearward face and a distal edge, and, when installed on the structural member, the rearward face of the cantilevered flange adjacent to the distal edge stands rearwardly relative to the remainder of the cantilevered flange.

In a still further additional feature of that aspect of the invention, the grommet has a divider extending internally of the peripheral wall to define a second passage therewithin.

In yet a further additional feature of that aspect of the invention, the divider is placed to lie outside the largest inscribed circle that can be constructed within the peripheral wall.

In yet still a further additional feature of that aspect of the invention, the trailing portion of the peripheral wall has an outwardly extending flange mounted thereon. The flange is substantially planar.

In another aspect of the invention, there is a grommet, for use with a structural member having a web and an opening defined in the web. The opening has at least three smoothly radiused corners and a flanged lip adjacent thereto. The grommet is moveable in a forward direction for insertion into the opening. The grommet comprises a peripheral wall having corner portions and side portions extending between the corner portions. The grommet has at least one passageway defined therethrough within the peripheral wall. Attachment fittings extend outwardly from at least three of the corner portions. Each of the fittings has a seating element extending outwardly relative to the wall and an abutment element mounted forwardly of the seating element. Each of the seating elements is engageable to one of (a) the web, and (b) the flanged lip adjacent to a corner of the opening. Each of the abutment elements is engageable to the other of (a) the web, and (b) the lip. The abutment element is moveable to a deflected position to permit introduction of the grommet into the opening, and biased to move to an opposed position relative to its corresponding seating element. The abutment and the seating element is co-operable to capture the web and the lip therebetween. When so captured, the abutment element in the opposed position is biased to discourage disengagement of the grommet from the opening.

In an additional feature of that aspect of the invention, the side portions are substantially straight and each has an inside face. The grommet has at least one partition wall lying inwardly of the peripheral wall to define at least one other passageway through the grommet.

In another additional feature of that aspect of the invention, the partition wall lies outside the largest inscribed circle that can be constructed inside the peripheral wall.

In a further additional feature of that aspect of the invention, the grommet has a plurality of partition walls. The partition walls co-operate with the peripheral wall to define a plurality of passageways through the grommet.

In a still further additional feature of that aspect of the invention, the side portions have respective leading portions and trailing portions. The seating elements extend outwardly from the corner portions adjacent the respective trailing portions and the abutment elements have a cam face oriented outwardly from the corner portions adjacent the respective leading portions.

In yet a further additional feature of that aspect of the invention, the corner portions comprise an archway having a pair of side columns and a spanning member. The abutment element depends from the spanning member.

In yet still a further additional feature of that aspect of the invention, the side portions extend linearly between the corner portions. The corner portions have corner wall facings standing outwardly of the walls such that a straight edge laid across the corner wall facings stands clear of the side wall lying therebetween.

In another additional feature of that aspect of the invention, at least one of the seating elements includes an outwardly cantilevered resilient member.

In yet another additional feature of that aspect of the invention, the sidewalls have a trailing edge, and the trailing edge has an outwardly extending flange formed thereon.

In yet still another additional feature of that aspect of the invention, at least one of the seating elements is resilient. The grommet is moveable to an inserted position relative to the structural member. In the inserted position the abutments are able to move to the opposed position and the resilient seating element is pre-loaded. The pre-loaded resilient seating element is operable to exert a rearward force on the abutments.

In a further additional feature of that aspect of the invention, at least one of the seating elements is resilient and has a distal tip region that is cantilevered outwardly from the peripheral wall. The distal tip region has a forwardly protruding formation thereon. The grommet is moveable to an inserted position relative to the structural member. In the inserted position the abutments are able to move to the opposed position and the forwardly protruding formation engages the structural member to cause the distal tip region to deflect rearwardly relative to the peripheral wall, thereby applying a pre-load to the resilient seating element. The pre-loaded resilient seating element is operable to exert a rearward force on the abutments, thereby squeezing the structural member between the abutments and the seating elements.

In yet a further additional feature of that aspect of the invention, the seating elements include flanges cantilevered out from the peripheral wall. The flanges have a rearward face and a distal edge, and, when installed on the structural member, the rearward face of the cantilevered flange adjacent to the distal edge stands rearwardly relative to the remainder of the cantilevered flange.

In still yet a further additional feature of that aspect of the invention, the peripheral wall has three planar side portions and three corner fitments. An outwardly extending flange surmounts the trailing edge of each of the side portions, the trailing face of the flanges being co-planar. The corner portions each include an archway having columns and an overspanning member. Each of the columns mate with an end of an adjoining side portion and the inner face of the arch has a skirt mounted thereacross. A resilient catch member is mounted to depend from the arch. The abutment is a rearwardly facing surface of the catch member. The catch member has an outwardly and rearwardly tapering cam surface. The cam surface is moveable to deflect the abutment inwardly. The columns are mounted to stand outwardly of the side wall portions to define a clearance rebate therebetween. The seating element includes a cantilevered flange extending outwardly about the corner portion and mating with the outward flanges of the trailing portions of the side wall portions. The cantilevered flange is resilient.

In another aspect of the invention, there is the combination of at least one beamlike longitudinally extending structural member, and at least one grommet for use in cooperation therewith. The structural member has a web. The web has a longitudinal edge, and a longitudinally extending main flange running along the edge. The web has at least one opening therein, and flangework formed adjacent to the opening. The grommet has a peripheral wall having an internal face defining a passageway. The wall has a leading portion that can be introduced into the opening in the web, and a trailing portion having at least one seating element extending outwardly of the wall to prevent passage of the trailing portion fully through the opening. The grommet has at least one biased member having an abutment element biased to an opposed position relative to the seating element. The biased member is moveable to a deflected position during introduction of the trailing portion into the opening. The grommet is moveable to engage the seating element against one of (a) the flangework and (b) the web, and, when so engaged the abutment element is moveable to the opposed position under the influence of the biased member. In the opposed position the abutment element discourages removal of the grommet from the opening.

In still another additional feature of that aspect of the invention, the opening has a periphery defined in the web. The peripheral wall has at least one side wall portion extending between a pair of sidewall ends. One of the seating elements and one of the abutment elements are located at each end thereof, and, in an installed position of the grommet relative to the structural member the side wall portion has a span free of contact with the periphery of the opening.

In yet another additional feature of that aspect of the invention, the structural member has a pair of opposed main flanges extending along opposite edges of the web. A plurality of the openings are formed in the web. Each of the openings has a base side portion extending parallel to one of the main flanges and a pair of side portions extending from the base side to meet at a smoothly radiused apex opposite the base side portion. The openings are arranged along the web in alternating side-by-side fashion with alternating diagonally extending struts formed in the web between pair of adjacent openings. The flangework extends along the struts and the base side portions.

In still yet another additional feature of that aspect of the invention, the opening has a base side portion extending parallel to the main flange and a pair of side portions extending from the base side to meet at a smoothly radiused apex opposite the base side portion. The side portions and the base portion of the opening meet at smoothly radiused base corners. The grommet engages the flangework at the base corners and at the apex.

In another additional feature of that aspect of the invention, the grommet has a base portion locatable adjacent the base portion of the opening, and a pair of side portions locatable adjacent to the side portions of the opening. The base portion and the side portions of the grommet meet at respective attachment fittings that seat in the corners and the apex of the opening.

In still yet another additional feature of that aspect of the invention, the flangework forms a continuous peripheral lip around the opening.

In a further additional feature of that aspect of the invention, the apex has a larger radius of curvature than either of the base corners.

In yet a further additional feature of that aspect of the invention, the web lies in a web plane. Portions of the flangework extend about the corners and the apex of the openings. The portions of the flangework have respective distal edges formed out of the plane of the web at a tapered angle whereby the entrance of the opening at the plane of the web is wider than the exit of the opening adjacent the distal edges. The leading portion is moveable along an insertion direction running from the entrance toward the exit of the opening.

In still yet a further additional feature of that aspect of the invention, the attachment fittings have column members shaped to conform to the taper of the flangework at the corners and at the apex.

In another additional feature of that aspect of the invention, each attachment fitting includes one of the abutments, one of the seating elements, and has a pair of the column members and an overspanning member attached thereto adjacent the leading portion of the grommet. Each attachment fitting has an arm depending from the overspanning member. The arm has the abutment formed thereon, and has an outwardly facing cam member engageable with the taper of the flangework to cause the abutment to deflect. In the opposed position the abutment engages the distal edge of the flangework.

In yet another additional feature of that aspect of the invention, each of the seating elements has an outwardly extending resilient wing. The resilient wing waves an interface member for engaging the web. The resilient member is operable to exert a rearward force on the abutment when the grommet is engaged with the structural element.

In a further additional feature of that aspect of the invention, the grommet includes at least one internal partition to define a plurality of passageways therethrough.

In a still further aspect of the invention, there is a kit comprising at least one sheet metal structural member and at least one grommet for use in co-operation therewith. The sheet metal structural member has a pair of opposed, spaced apart, parallel main flanges and a web extending therebetween. The web has an outer face lying predominantly in a web plane and an inner face lying to one side thereof The main flanges extend perpendicularly to the web plane and away from the outer face, to give the sheet metal structural member a C-shaped appearance when viewed from one end thereof The web has a plurality of triangular openings formed therein in an alternating arrangement, and a plurality of alternating, flanged diagonal struts formed between adjacent pairs of the openings. The openings have smoothly radiused corners. The web has lip flangework formed therein adjacent each opening. The lip flangework stands proud of the inside face of the web. The grommet has a peripheral wall having an internal face defining a passageway. The wall has a leading portion that can be introduced into one of the openings in the web, and a trailing portion having at least one seating element extending outwardly of the wall to prevent passage of the trailing portion fully through the one opening. The grommet has at least one biased member having an abutment surface biased to an opposed position relative to the seating element. The biased element is moveable to a deflected position during introduction of the trailing portion into the one opening. The abutment element and the seating element defines a capture depth at least great enough to capture the lip flangework and the outer face therebetween when the seating element engages the sheet metal structural member and the abutment surface moves to the opposed position.

In an additional feature of that aspect of the invention, the lip flangework is continuous flange extending about the triangular opening.

In a further additional feature of that aspect of the invention, the smoothly radiused corners of adjacent openings define root portions of the struts adjacent the corners. The grommet has three seating elements and three biased members, spaced about the peripheral wall in positions to engage the sheet metal structural member adjacent the smoothly radiused corners of the opening.

In yet a further additional feature of that aspect of the invention, portions of the flangework extend about the corners and apex of the opening. The portions of the flangework have respective distal edges formed out of the web plane at a tapered angle such that the entrance of the opening at the plane of the web is wider than the exit of the opening adjacent the distal edges. The leading portion is moveable along an insertion direction running from the entrance toward the exit of the opening. The grommet has attachment fittings locatable in the corners and the apex of the opening. The attachment fittings have column members shaped to conform to the taper of the flangework at the corners and at the apex.

In still yet a further additional feature of that aspect of the invention, portions of the flangework extend about the corners and the apex of the opening. The portions of the flangework have respective distal edges formed out of the web plane at a tapered angle such that the entrance of the opening at the web plane is wider than the exit of the opening adjacent the distal edges. The grommet includes attachment fittings engageable with the structural member adjacent the corners and apex of the opening. Each of the attachment fittings includes one of the abutments, one of the seating elements, has a pair of the column members and an overspanning member attached thereto adjacent the leading portion of the grommet. Each attachment fitting has an arm depending from the overspanning member. The arm has the abutment formed thereon, and has an outwardly facing cam member engageable with the taper of the flangework to cause the abutment to deflect. In the opposed position the abutment engages the distal edge of the flangework.

In yet another additional feature of that aspect of the invention, each of the seating elements has an outwardly extending resilient wing. The resilient wing waves an interface member for engaging the web, and the resilient member is operable to exert a rearward force on the abutment when the grommet is engaged with the structural element.

In a further additional feature of that aspect of the invention, the peripheral wall has corner portions and straight side portions extending between the corner portions. The corner portions have corner wall facings standing outwardly of the walls such that a straight edge laid across the corner wall facings stands clear of the side wall lying therebetween.

In yet a further additional feature of that aspect of the invention, the grommet has at least one partition wall lying inwardly of the peripheral wall to define at least one other passageway through the grommet.

In another aspect of the invention, there is the combination of at least one beam-like structural member that extends in a longitudinal direction, and at least one grommet for use in co-operation therewith. The structural member has a planar web. The web has a straight longitudinal edge, and a longitudinally extending main flange running along the edge. The web has a plurality of alternating wide portions and narrow portions defining a longitudinal zig-zag edge. The web has an opening defined in each of the wide portions. Each opening has a base portion parallel to the edge and a pair of side portions extending away from the base portion to meet at an apex. The opening has smoothly radiused corners between the base portion and the side portions, and at the apex. The structural member has a lip flange formed about the opening. The lip flange has a distal edge lying away from the web. The grommet has a peripheral wall having an internal face defining a passageway. The wall has a leading portion that can be introduced into the opening in the web, and a trailing portion having at least one seating element extending outwardly of the wall and engageable with the web to prevent passage of the trailing portion fully through the opening. The grommet has at least one biased member having an abutment element biased to an opposed position relative to the seating element. The biased member is moveable to a deflected position during introduction of the trailing portion into the opening. The grommet is moveable to engage the seating element with the web and the abutment element with the lip flange to capture the web. In the opposed position the abutment element discourages removal of the grommet from the opening.

In an additional feature of that aspect of the invention, the opening has a generally isosceles triangular shape, dividing the wide portion into a pair of strut-like portions. The peripheral wall has three straight side portions and three corner fittings. One of the corner fittings is sized to fit the apex, and the other two of the fittings is sized to fit the other two corners of the opening. The corner fittings stand proud of the side portions such that a straight edge placed across any two of the fittings stands clear of the straight side portion lying therebetween.

In a further additional feature of that aspect of the invention, the fittings each include one of the abutment and one of the seating elements, and the fittings act against the web and the lip flange at the corners of the opening.

In yet a further additional feature of that aspect of the invention, an outwardly extending flange surmounts the trailing edge of each of the side portions. The trailing face of the flanges is co-planar. The seating element includes a cantilevered flange extending outwardly about the corner portion and mating with the outward flanges of the trailing portions of the side wall portions. The cantilevered flange is resilient and has a portion engageable with the web. The corner portions each include an archway having columns and an overspanning member. Each of the columns mates with an end of an adjoining side portion and the inner face of the arch has a skirt mounted thereacross. A resilient catch member is mounted to depend from the arch. The abutment is a rearwardly facing surface of the catch member. The catch member has an outwardly and rearwardly tapering cam surface. The cam surface is moveable to deflect the abutment inwardly. The grommet is movable to a seated position relative to the structural member, and, in the seated position, the resilient member bears against the web under a pre-load and carries and exerts a force to urge the abutment to bear against the distal edge of the lip flange.

BRIEF DESCRIPTION OF THE DRAWINGS

FIG. 1b is a cross-sectional view of a strut of one of the structural members of FIG. 1a taken on section '1b–1b';

FIG. 1c is a partial cross-sectional view of a corner portion of one of the structural members of FIG. 1 taken on '1c–1c';

FIG. 2a is an isometric view of the large grommet of FIG. 1;

FIG. 2b is a plan view of the grommet of FIG. 2a;

FIG. 2c is a plan view of the grommet of FIG. 2a taken opposite to FIG. 2b;

FIG. 2d is a detail view of the grommet of FIG. 2a taken on arrow '2d';

FIG. 3b is a side view, in section, of the grommet of FIG. 2a as it is being introduced into the opening of FIG. 3a;

FIG. 3c is a side view, in section, of the grommet of FIG. 2a in a seated position relative to the structural member of FIG. 3a;

FIG. 5a shows a top plan view of the small grommet of FIG. 1a;

FIG. 5b shows a bottom plan view of the grommet of FIG. 5a;

FIG. 5c shows a cross-section of the grommet of FIG. 5a on section '5c–5c';

FIG. 6b shows a cross-sectional view of the structural member of FIG. 6a;

FIG. 7b shows a sectional view of the structural member of FIG. 7a;

FIG. 8b shows a sectional view of the structural member of FIG. 8a;

FIG. 9a shows an alternate cross-section to the cross section of FIG. 3a;

FIG. 9b shows another alternate cross-section to the cross-section of FIG. 3a;

FIG. 9c shows a further alternate cross-section to the cross-section of FIG. 3a;

FIG. 10a shows a side view of another alternate embodiment of structural member to the structural member of FIG. 1;

FIG. 10b shows an isometric view of a pair of structural members as in FIG. 10a with tips embedded in concrete;

FIG. 10c is a detail of a flanged opening and embedment formation of the structural ember of FIG. 10a;

FIG. 11a shows an alternate cross-section for the structural member of FIG. 10a;

FIG. 11b shows another alternate cross-section for the member of FIG. 10a;

FIG. 11c shows a further alternate cross-section for the member of FIG. 10a;

FIG. 12a shows a side view of a pair of structural elements joined together; and FIG. 12b shows a cross-sectional view of the elements of FIG. 12a.

DETAILED DESCRIPTION OF THE INVENTION

Figure 1A:
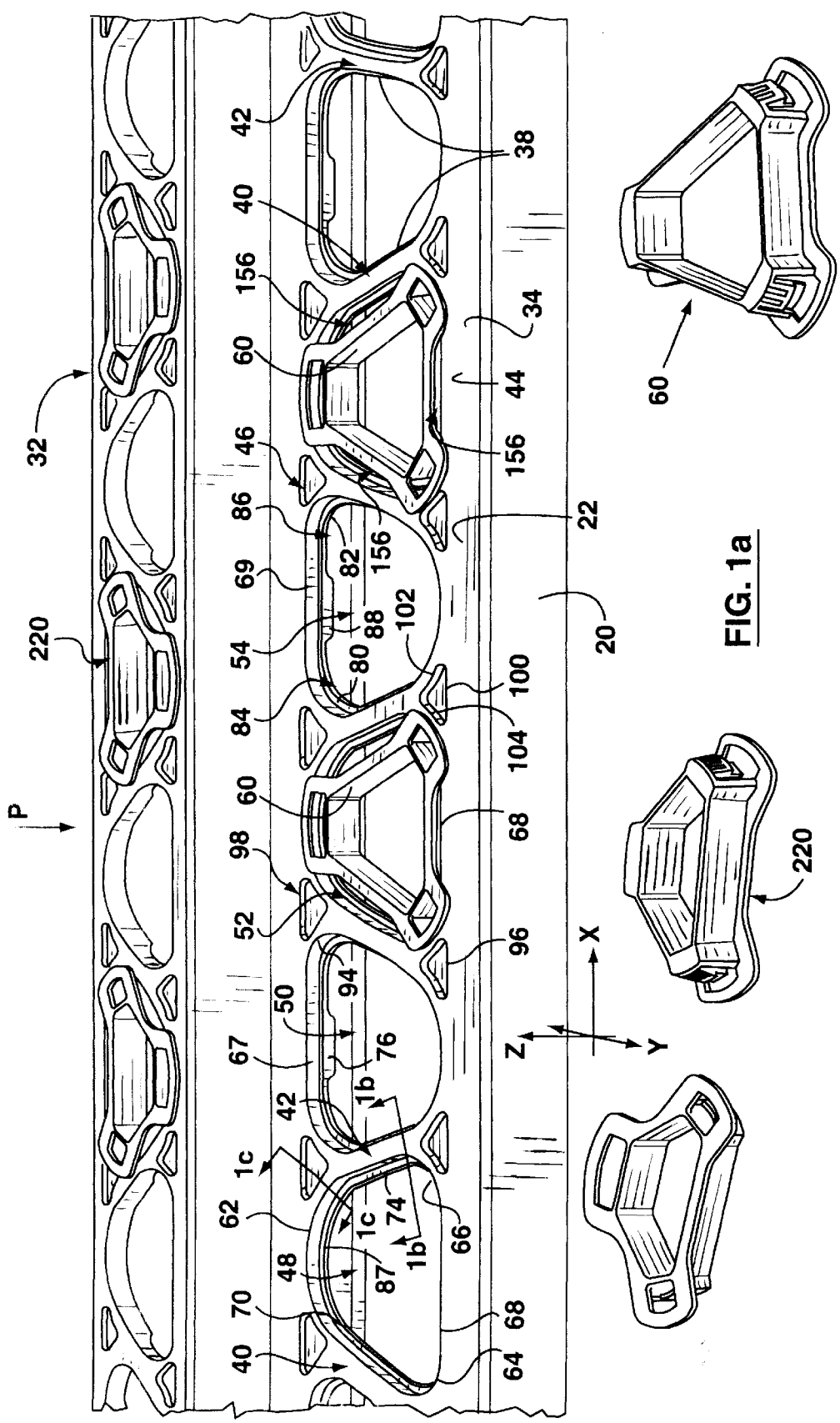
FIG. 1a is a general arrangement, perspective view of a pair of sheet metal structural members of different sizes each grommets mounted therein according to the principles of the present invention; with additional small and large grommets shown in the foreground.

The description which follows, and the embodiments described therein, are provided by way of illustration of an example, or examples of particular embodiments of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order more clearly to depict certain features of the invention.

Referring to FIGS. 1a, 3a, 3b, and 3c, a sheet metal structural member is indicated generally as 20. It has a web 22 and a pair of generally opposed, longitudinally extending parallel main flanges 24 and 26 that extend perpendicularly out of the plane of web 22 to form a generally 'C' shaped channel section, with the toes of flanges 24 and 26 having an inwardly bent lip 28, 30. In the example of FIG. 1, member 20 has width and depth dimensions to simulate a (nominal) 2"×6", although 2"×4" studs (seen in the background of FIG. 1 and indicated as 32), 2"×8" beams or other stud or beam sizes can also be formed. Web 22 can be termed the back of the C-channel section, and lies, generally, with its outer face 34 in a web plane indicated as 'W'. The inner face 36 of web 22 lies to one side of web plane 'W', and the legs of the section, main flanges 24 and 26, extend to the same side of plane 'W'. The longitudinal direction is indicated by an 'X', the axial direction perpendicular to 'X' and lying in plane 'W' is indicated as 'Y' and the axial direction perpendicular to plane 'W' is indicated as 'Z'. The width of web 22, and the overall depth of structural member 20, are measured in the 'Y' direction, and the width of main flanges 24 and 26 is measured in the 'Z' direction.

Web 22 of member 20 has been blanked and formed to leave an array 38 of alternating diagonal struts 40 and 42 that extend between web margins 44 and 46 whence flanges 24 and 26 extend. Openings, of which one representative example is indicated as 48, are defined in the spaces bounded by respective diagonal struts 40 and 42, and margins 44 and 46, as the case may be.

A one-piece, snap fit grommet 60 is mounted to member 20 by being pushed into opening 52 in the insertion direction indicated by arrow 'P'. Opening 52 is, for the purposes of this description, identical to any one of openings 48, 50 or 54, such that grommet 60 could be mounted in any of them, interchangeably. Grommet 60 provides a protected port for services, such as a water pipe or electrical conduit or cable (not shown) to traverse web 22.

Opening 48, being typical, will now be described in detail. It has a generally triangular shape, having a first radiused corner defined at the altitudinal vertex, or apex 62, lying between struts 40 and 42, a second, radiused base corner 64 lying between strut 40 and margin 44, and a third, radiused corner 66 lying between strut 42 and margin 44. In general, the triangular shape so defined is an isosceles triangle. The radius at base corners 64 and 66 is smaller than the larger, more generous radius of apex 62. As shown, the base 68 of the triangular shape lies along margin 44. Bases 67 and 69 of the adjacent triangular openings, indicated as 50 and 54, lie along the margin 46, each triangle alternating in orientation relative to its neighbours.

Flangework, in the nature of a continuous rim, or lip flange 70 is formed out of the plane of web plane 'W' in the direction away from outer face 34, and extends fully about the periphery of opening 48. Lip flange 70 includes left and right hand strut flanges 72, 74 that extend along the sides of struts 40, 42 and a base side flange 76 formed on margin 44 (similar flanges extend along the sides of the adjacent opening, 50). In each of base corners 64 and 66 there is a corner flange portion 80, 82 whose free edge 84, 86 lies at a shallower depth than the free edge of flanges 72 or 74, and at a shallower depth than the free edge of the medial portion 88 of flange 76. Lip flange 70 also includes an apex flange 87 which runs along apex 62 and smoothly into strut flanges 72 and 74.

Each of struts 40 and 42 has a medial portion 90 and root portions 92, 94 at either end. In each of root portions 92, 94 there is a generally triangular indentation 96, 98 stepped to one side of plane 'W' of web 22 generally. Each of indentations 96, 98 has a generally straight base side 100, another side 102 facing the altitudinal vertex of the adjacent opening, and a curved side 104 sharing a center of curvature with base corner 64 or 66 as the case may be. In section, medial portion 90 has a back 106 lying in the plane of web 22 generally, and a pair of formed legs, being flanges 72 and 73 in the case of strut 40, and flanges 74 and 75 in the case of strut 42.

Flanges 72 and 73 (and 74 and 75) lie at an out-of-plane true angle to the plane of web 22 generally that is indicated by a such that flanges 72 and 73 present a tapered wall that has a root at back 106 and a distal edge lying away from web 'W'. By comparison, corner flange portion 80 (and 82) is formed on an angle β to extend away from plane 'W' and presents a tapering surface with a distal edge 84, β being less than α.

Grommet 60 also is shaped to conform, generally, to the shape of opening 48 (or 50, 52, 54 as shown). Grommet 60 has a peripheral wall 110 having a base side 112, base corners 114 and 116, a pair of sides 118 and 120 rising toward an altitudinal corner, or apex 122. As such, it has a general shape in plan view of an isosceles triangle, with truncated corners. Attachment fittings 124, 126 and 128 are located at respective corners 114, 116 and apex 116. Peripheral wall 110 has a forward or leading portion, 130, that is, the portion that is first introduced into opening 48 during insertion of grommet 60, and a rearward or trailing portion 132 that follows the leading portion during insertion.

Figure 3C:
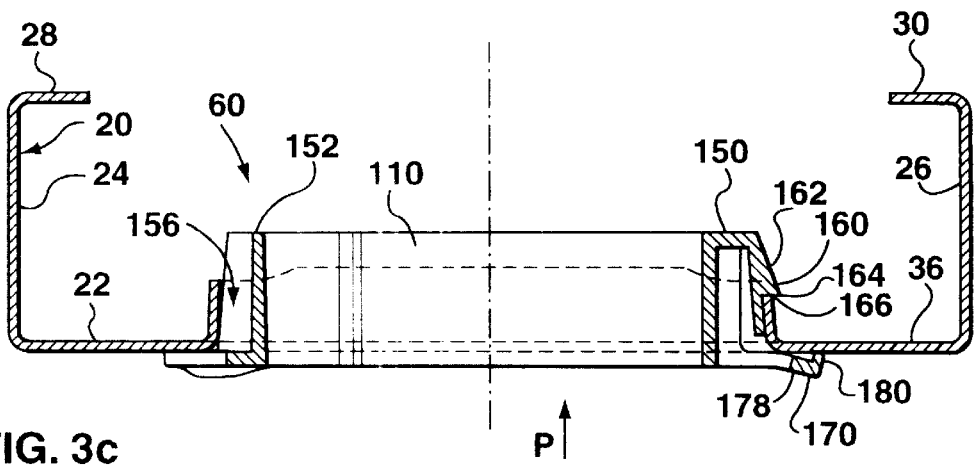
Figure 3B:
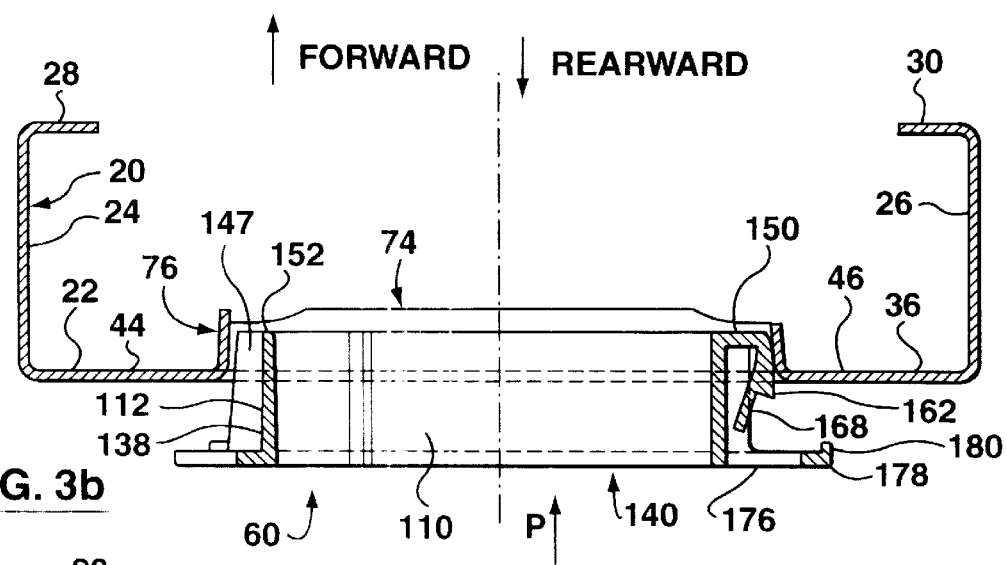
Figure 3A:
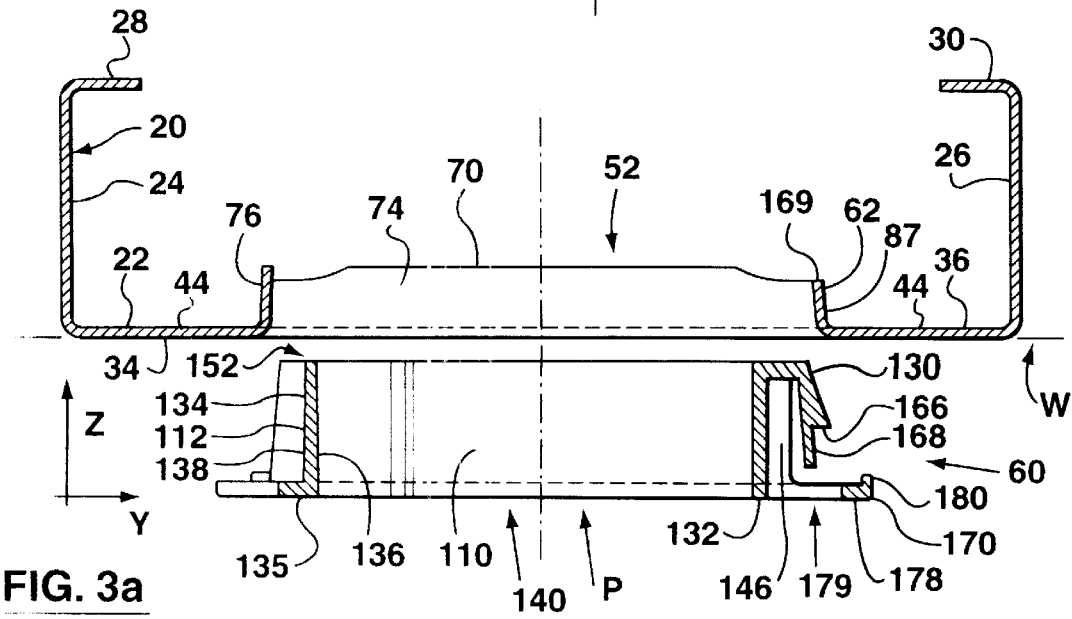
FIG. 3a is a side view, in section, of the grommet of FIG. 2a as it is about to enter an opening in a structural member.

Each of sides 112, 118 and 120 has a cross-section as shown in FIG. 3a. Each has a side wall or leg, 134 that is generally rectangular in section, and a trailing edge flange 135 extending perpendicularly relative to leg 134. Leg 134 is slightly tapered, having a draft angle to facilitate removal from the mold on manufacture. Leg 134 has an inner face 136 that faces inwardly toward, and defines a portion of the boundary of, an internal passageway 140. Internal passage 140 extends generally in the direction of insertion indicated by arrow 'A', and is formed to carry services through web 22, such as plumbing, wiring, vacuum hoses, or other hardware. Leg 134 also has an external, or outer face 138 that faces outward relative to passageway 140.

Corners 114 and 116 are right and left hand images of each other. If sides 112, 118, and 120 were extended they would meet at a sharp corner. Instead they are truncated at the respective corner sub A. At the points where sides 112, 118 and 120 are truncated in this way, grommet 60 has corner webs 142, 143, and 144 which form part of, and complete, the boundary of passageway 140 formed by peripheral wall 110.

For the purposes of description, attachment fitting 128 at apex 122 differs from attachment fittings 124 and 126 only in size, corner radius, aspect ratio and other dimensions rather than in nature. Thus, although only one fitting is described, the description is applicable to the fittings as well.

Each attachment fitting has an archway 146 having a pair of left and right hand columns 147 and 148 surmounted by an overspanning member in the nature of a lintel 150 that surmounts the distal ends of columns 147 and 148 and has a forward surface lying flush with the leading edge 152 of peripheral wall 110. Columns 147 and 148 stand outwardly from peripheral wall 110. That is, the inner edge of columns 147 and 148 back on the adjacent sidewall portions while their outer left and right hand edge facings 153 and 154 stand outwardly of the planes defined by outer faces 138 of the respective wall portions. In side view, as seen in the detail of FIG. 2d, the leading portion of column .147 (and 148) has a rake angle ψ such that column 147 (or 148) is wider at its base than at its distal end. A straight edge placed across a pair of columns at either end of any of side portions 112, 118 or 120 will stand clear of their respective outer faces, 138. That is, a rebate 156 formed between outer surface 138 and the columns at either end thereof Further, facings 153 and 154, and the outward edge of lintel 150 are formed to conform to an arcuate surface, such that the leading end of grommet 60 can be introduced into opening 52, and so that facings 153 and 154 seat in the smoothly curved corners of, for example, opening 48, 50, 52 or 54.

Each attachment fitting 124, 126, or 128 includes a catch member 160 that depends from lintel 150. It has an outwardly oriented tapered facing, in the nature of a fluted cam face 162, the taper being such that the depending edge 164 is biased to stand further outwardly than facings 153 and 154. A shoulder, in the nature of a rearwardly facing abutment 166 extends inwardly from edge 164 to terminate at a rearwardly extending depending skirt, or tab 168 of catch member 160. In operation, when grommet 60 is moved forward along the insertion direction, cam face 162 will tend to engage the arcuate tapering surface of one or another of corner flange portions 80, 82 and apex flange 87. This will in turn tend to cause catch member 160, and hence abutment 166 to deflect inwardly into the alcove, or chamber, defined inside archway 146. Catch member 160 is resilient, and is biased outwardly. When grommet 60 is advanced sufficiently far for edge 164 to clear the distal edge 169 of the respective corner flangework, abutment 166 is able, under the bias of catch member 160, to move outwardly to engage distal edge 169. In this outward position abutment 166 discourages rearward movement of grommet 60, preventing its removal from opening 52.

Each attachment fitting 124, 126 or 128 also includes a seating element 170 in the nature of an outwardly extending cantilevered wing 172 that has a pair of left and right hand flange extensions 174 and 176 that lie flush with, and are smoothly rooted into flanges 135, of peripheral wall 110. An arcuate bridging member 178 lies in the same plane as, and connects the distal ends of, flange extensions 174 and 176.

As thus arranged the trailing edge of web 142, 143, or 144 as the case may be, the inside edge of flange extensions 174 and 176, and the inside edge of bridging member 178 define a port 179 through which mold extensions may move during fabrication of grommet 60 to form the underside of lintel 150 and the inward or rearward face of catch member 160.

On the leading face of each seating element is a forwardly protruding nub 180 that engages the outer face 34 of web 22 when grommet 60 is inserted. Seating element 170 is resilient. When the trailing face of grommet 60 is pushed forward enough to cause abutment 166 to snap into position, the forward motion also causes nub 180 to seat against web 22, and, in so doing, a pre-load is applied to seating element 170. In this position abutment 166 sits in a position that is generally opposed to seating element 170 and the space between them, measured in the direction of insertion, is sufficient to permit capture of apex flange 87 (or flange portions 80 or 82 as the case may be) and web 22. When grommet 60 is left in place, the preload in seating element 170 will tend to bias peripheral wall 110 rearward relative to the insertion direction, and in so doing, will tend to exert a force to urge abutment 166 more firmly against distal edge 169, thus tending to immobilise grommet 60. This preload may also tend to help grommet 60 resist loosening and rattling under modest vibration.

When grommet 60 is seated in this way in opening 48, 50, 52 or 54, the outer faces 138 of leg 134 of each of the three sides of peripheral wall 110 will stand clear of the corresponding facing portions of flangework lip flange 70. This increases the likelihood that vibration loads will not be transferred to or from the mid sections of the struts, but rather will be carried to the corners at margins 44 and 46.

Figures 2B, 2C:
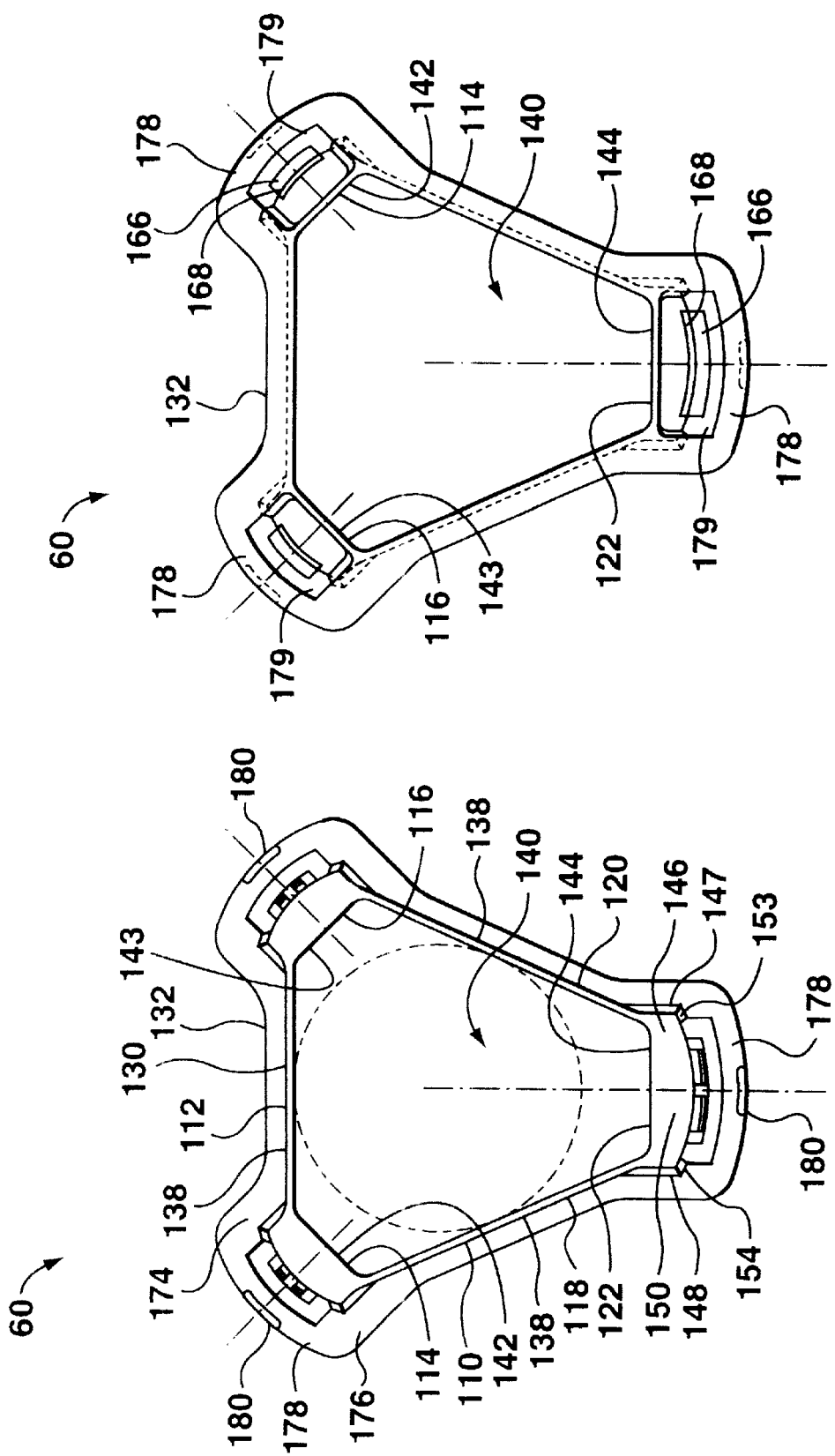

In alternative embodiments, other geometric arrangements of seating element can be used. For example, flange extensions 174 and 176 could be curled forward to present a leaf-spring-like arrangement for deflection on insertion. Not all of the seating elements need be resilient. In some cases it may not be desirable to have any pre-loaded seating elements, in others a single pre-loaded element or spring would suffice to pre-load all of the fittings. For example, although the configuration shown in FIGS. 2a, 2b and 2c is preferred, a grommet having a pair of abutments (or seating elements) located at the mid-portion of the long sides 118 and 120 could be opposed by a pair (or more) of seating elements (or, abutments) arranged in the corners, or one at apex 122 and one along the middle of the base side 112. A single spring loaded element, among a total of four seating elements and abutments, would then serve to pre-load all of the others.

Figure 4A:
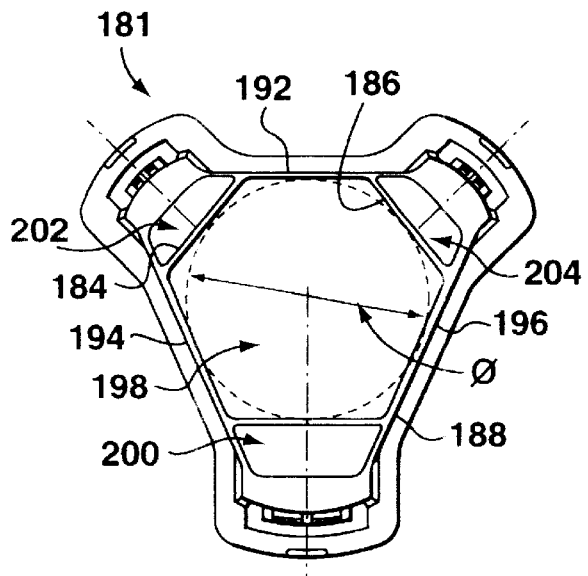
FIG. 4a shows a plan view similar to FIG. 2b of an alternate embodiment of grommet having internal partitions.
Figure 4B:
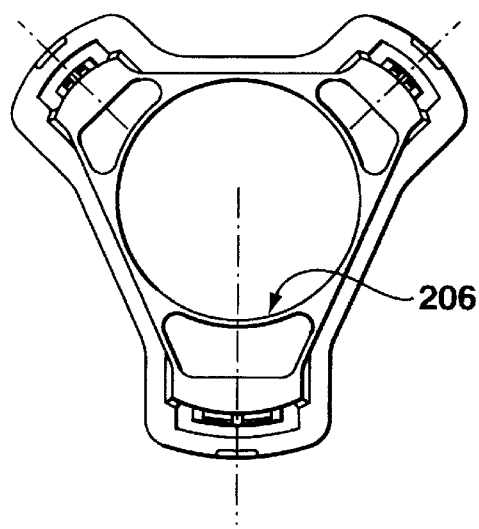
FIG. 4b shows a further alternative embodiment to the grommet of FIG. 2b.
Figure 4C:
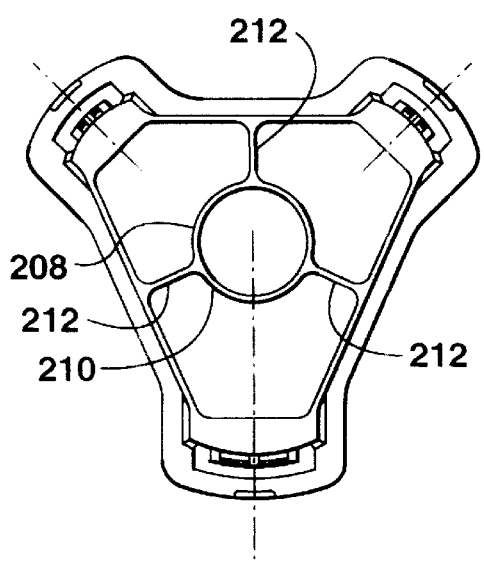
FIG. 4c shows another alternative embodiment to the grommet of FIG. 2b.
Figure 4D:
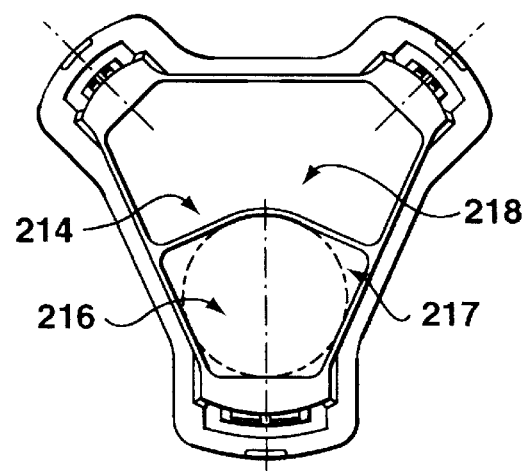
FIG. 4d shows yet another alternative embodiment to the grommet of FIG. 2b.

In an alternative embodiment as shown in FIG. 4a, a grommet 181 has three internal dividers 182, 184, and 186 that subdivide the space enclosed within a peripheral wall 188, similar in other respects to peripheral wall 110 described above. An allowable maximum outer pipe diameter φ is defined by the largest circular section that can be inscribed within side wall portions 192, 194 and 196, and is shown in dashed lines in main passageway 198. (It will be appreciated that a slightly larger pipe can be carried, or the enclosure of peripheral wall 188 can be made slightly smaller, if an interference fit is desired.) As illustrated, each of dividers 182, 184 and 186 is located outside the circle of diameter φ, and the subsidiary passages so formed, indicated as 200, 202 and 204, are available to carry other services. Dividers 182, 184, and 186 need not be straight walls, or webs, but could be formed on a circular arc, as shown at 206 in FIG. 4b. Alternatively, as shown in FIG. 4c a spider 208 having a circular center 210, such as may be suited to a water pipe, and outwardly radiating partitions in the nature of dividers 212 could be used. One or two dividers could be used rather than three as shown, or more dividers could be used depending on the number, shape and size of the passageways to be formed. In FIG. 4d a single divider 214 divides the internal passageway into a minor section 216 for a pipe 217 (shown in dashed lines) and a major portion 218 for other services. Divider 214 is bent so that the long sidewalls of the grommet can be squeezed inward to flex divider 218, and, when released it holds snug against pipe 217.

Grommet 60 is a molded part made from a polypropylene homopolymer plastic. It is considered to be and may tend to function as an electrical insulator. The edges of grommet 60 that face inward toward passageway 140, or that stand rearwardly of web 22 when installed, have a small radius (typically 0.047") to decrease the likelihood that service conduits or cables passing through grommet 60 will encounter a sharp edge. In the specific embodiment illustrated in FIG. 2a, grommet 60 is of a size to fit an opening in a (nominal) 2×6 member.

Alternative sizes of grommet can also be made, as typified by grommet 220 shown in the foreground of FIG. 1a, and installed in the (nominal) 2"×4" structural member 38 lying in the background of FIG. 1a. Grommet 220 is shown in top, bottom and sectional views in FIGS. 5a, 5b and 5c respectively. It has attachment fittings 222, 224, and 226 of the same nature and features as attachment fittings 124, 126 and 128. Openings 230, 232, and 234 defined in web 236 of structural member 38 have the same pitch between centers as openings 48, 50, 52 and 54 described above, but a shallower height, reflecting the shallower depth of section of member 38 as compared to member 20. Grommet 220 differs from grommet 60 primarily in the ratio of its altitude, or height, in plan view, as measured from base sidewall 238 to apex 240. Thus sidewalls 242 and 244 are each shorter than base sidewall 238, whereas base sidewall 112 is the shortest side of grommet 60. A similar lengthening or shortening of aspect ratio permits a family of grommets to be manufactured suitable for a family of structural members sharing the same pitch between adjacent through-web openings.

Although structural member 22, as shown in FIGS. 1a, 1b, and 1c is preferred, other arrangements of flangework could be presented. For the purposes of the present invention it is not necessary that the flangework extend fully and continuously about the entire periphery of the opening. The flangework could, for example, extend only along the sides of the struts, and in the strut root portions. The flangework can be of varying height, or depth, about the periphery. The flangework can taper from a deepest section at the mid span of the struts to shallower portions adjacent the roots, or to taper into no flange at all, or could be formed only at the roots.

Figure 6A:
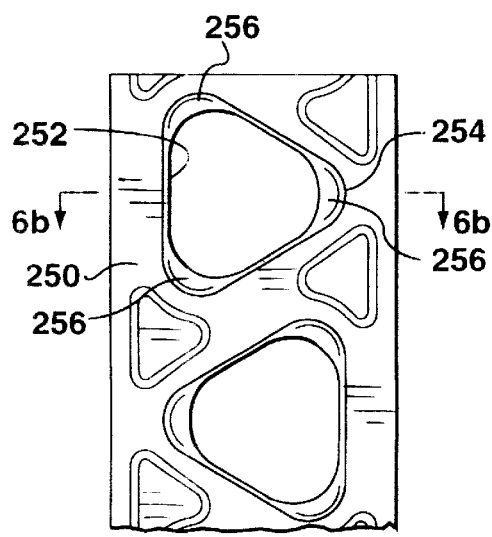
FIG. 6a shows a side view of an alternate embodiment of structural member to the structural member of FIG. 1.
Figure 6B:
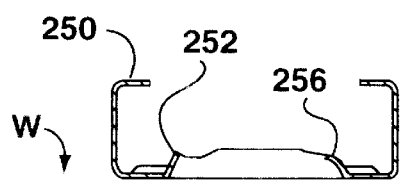

For example, in FIGS. 6a and 6b a structural member 250 has a lip flange 252 that is less sharply angled from web plane 'W' that that of structural member 20. The openings defined in structural member 250 are more sharply triangular than opening 48, having the form of equilateral triangles with a common radius of curvature at each corner. The radius at the free edge of the corner flange portions 254 is larger than at the plane of web 'W', yielding a relatively large, relatively shallowly angled corner web 256.

Figure 8A:
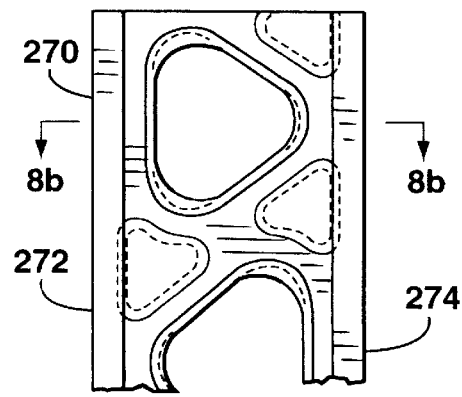
FIG. 8a shows a side view of another alternate embodiment of structural member to the structural member of FIG. 1.
Figure 8B:
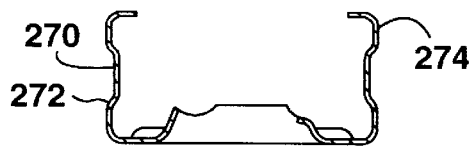
Figure 7A:
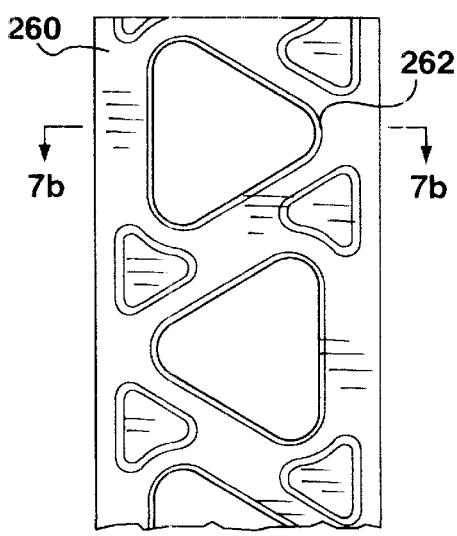
FIG. 7a shows a side view of another alternate embodiment of structural member to the structural member of FIG. 1.
Figure 9A:
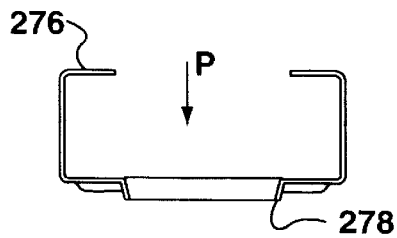
Figure 9B:
Figure 7B:
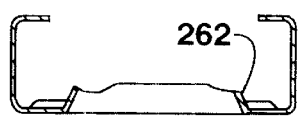
Figure 9C:
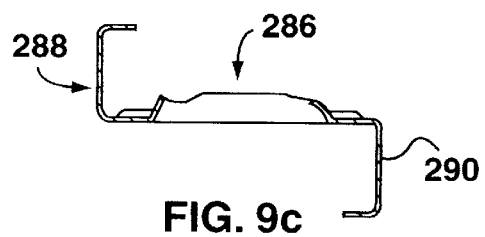

In FIGS. 7a and 7b a structural member 260 is similar to structural member 250, except insofar as it employs a steeper corner flange portion 262. In FIGS. 8a and 8b a relatively heavy section structural member 270 had formed flanges 272 and 274, and a deeper lip flange 274, than member 250. In FIG. 9a a structural member 276 has a lip flange 278 that is formed outwardly of the section, rather than inwardly as in FIG. 3a., such that the insertion direction of grommet 60 would tend to be reversed. In FIG. 9b a structural member 280 has asymmetric main flanges 282 and 284. In FIG. 9c a structural member 286 has one flange 288 formed to one side of web plane 'W', and another flange 290 formed to the other side. Grommets such as grommet 60 or grommet 220, depending on the size required, can be installed to co-operate with each of the illustrated sections noted above.

Further, although the preferred form of opening, and of grommet, is a form that is generally similar to an isosceles triangle with rounded corners, other shapes could be used. For example, a trapezoidal opening between the opposed margins of the web and a pair of diagonally inclined struts is also possible. As the radius of curvature of the apex corner increases, the resultant opening tends to take on a 'D'-shaped appearance in plan view, particularly as the width of section increases relative to the base dimension of the opening, or as the radius of the apex approaches half the length of the base side. In general, the opening has a base portion adjacent to one margin of the web, and a pair of side portions that extend away from the base portion to meet at an apex adjacent to the other margin of the web.

Another type of roll-formed structural member is shown in FIGS. 10a and 10b as 300. It has a web 302 having wide portions 304 alternating with narrow portions 306 to give a saw-tooth, or zig-zag appearance. One edge 308 of web 302 is straight while the other edge 310 undulates. Along edge 308 member 300 has a longitudinal main flange structure 312. Along undulating edge 310 member 300 has a lip, or edge reinforcement flange 314 extending perpendicular to the plane of the web.

Triangular openings 316 are defined centrally in each of the wide portions of web 302, each triangular opening 316 having a peripheral flange 318 and smoothly radiused base and altitudinal corners 320, 322 and 324. Each triangular opening tends to divide its respective wide portion into a pair of tapering triangular struts 326 and 328 that meet at a point 330. The flange 314 acts as an embedment formation for point 330, but in addition point 330 also has defined in it, adjacent flange 314, an aperture 332 through which a cast material such as concrete can flow. Further, as shown in FIG. 10c, the embedment formation can include a tongue 334 that extends laterally from the web in the opposite direction from flange 314, and can be formed from the blanked-out material removed to form aperture 332. As illustrated in FIG. 10a, the tip of point 330 is embedded in cast material 336 to a level lying between flange 314 and the altitudinal corner of flange 314. A grommet, such as grommet 60 or grommet 220, with suitable adjustments for size of opening and depth of flange to be captured, can be seated in opening 316. As such, services carried through the grommet are carried in a controlled position, through the web, at a position between main flange 312 and flange 314, through the controlled geometry of opening 316. The geometry of opening 316 is controlled in the sense that it is determined by the shape of dies in a rotary press as the point of manufacture of the structural member. There may tend to be much less control over the dimension between flange 314 at the narrow throat 338 and the cast material.

Main flange 312 can be formed in a variety of configurations. As shown in FIG. 11a The main flange can be a triangular element 340, or other tube shape, whether circular of polygonal. As shown in FIG. 11b, the main flange 342 can be more or less channel-shaped, with a relatively large outboard leg 344. As shown in FIG. 11c a main flange 346 can be a main flange 348 can be formed in the shape of an angle iron with a main leg 350 parallel to the cast material, and a small lip 352 at the outboard distal extremity. In FIGS. 12a and 12b, a pair of structural members 360 and 362 having undulating edges are mounted back-to-back to form a beam having a pair of parallel main flanges 364 and 366. As above, each has an opening 368 with a formed lip 370 to which a grommet such as grommet 60 or 220 can mount, thereby providing a controlled dimension protected passageway for carrying services.

Various embodiments of the invention have now been described in detail. Inasmuch as changes in and or additions to the above-described best mode may be made without departing from the nature, spirit or scope of the invention, the invention is not to be limited to those details, but only by the appended claims.

We claim:

1. A grommet, for use with a structural member having a web and an opening defined in the web, the opening having flangework adjacent the opening, the grommet being insertable into the opening when moved forwardly along an insertion direction, wherein said grommet comprises:

a peripheral wall defining a passageway therewithin, said wall having a leading portion for insertion into said opening and a trailing portion; and at least two seating elements extending outwardly from said trailing portion of said wall to prevent said trailing portion from passing through said opening;

fittings for engaging the flangework, said fittings being connected to said peripheral wall; at least two of said fittings having abutments connected thereto, said abutments being moveable to a deflected position to permit entry of said leading portion into said opening, and said abutments being biased outwardly relative to said peripheral wall to an opposed position relative to said seating elements;

said seating elements being spaced from said abutments in said insertion direction to permit the web flangework to be captured therebetween; and said abutments and said seating elements being spaced about said peripheral wall to inhibit forward and rearward motion of said grommet relative to the structural member in said insertion direction when said abutments are in said opposed position;

said peripheral wall has a straight side portion between two of said attachment fittings; and said two attachment fittings standing proud of said side portions such that a straight edge placed across said two attachment fittings stands clear of the straight side portion lying therebetween.

2. The grommet of claim 1 wherein:

at least one of said seating elements is resilient;

said grommet is moveable to an inserted position relative to the structural member, in said inserted position said abutments are able to move to said opposed position and said resilient seating element is pre-loaded; and said pre-loaded resilient seating element is operable to exert a rearward force on said abutments.

3. The grommet of claim 1 wherein:

at least one of said seating elements is resilient, has a distal tip region that is cantilevered outwardly from said peripheral wall, and said distal tip region has a forwardly protruding formation thereon;

said grommet is moveable to an inserted position relative to the structural member, in said inserted position said abutments are able to move to said opposed position and said forwardly protruding formation is engageable with said structural member to cause said distal tip region to deflect rearwardly relative to said peripheral wall, thereby applying a pre-load to said resilient seating element; and said pre-loaded resilient seating element is operable to exert a rearward force on said abutments, thereby squeezing the structural member between said abutments and said seating elements.

4. The grommet, of claim 1 wherein said seating elements include flanges cantilevered out from said peripheral wall, said flanges having a distal edge, and, when installed on said structural member, the distal edge of said cantilevered flange is deflected rearwardly.

5. A grommet, for use with a structural member having a web and an opening defined in the web, the opening having flangework adjacent the opening, the grommet being insertable into the opening when moved forwardly along an insertion direction, wherein said grommet comprises:

a peripheral wall defining a passageway therewithin, said wall having a leading portion for insertion into said opening and a trailing portion; and at least two seating elements extending outwardly from said trailing portion of said wall to prevent said trailing portion from passing through said opening;

at least two abutments connected to said peripheral wall, said abutments being moveable to a deflected position to permit entry of said leading portion into said opening, and said abutments being biased outwardly relative to said peripheral wall to an opposed position relative to said seating elements;

said seating elements being spaced from said abutments in said insertion direction to permit the web flangework to be captured therebetween;

said abutments and said seating elements being spaced about said peripheral wall to inhibit forward and rearward motion of said grommet relative to the structural member in said insertion direction when said abutments are in said opposed position; and said grommet having a divider extending internally of said peripheral wall to define a second passage therewithin.

6. The grommet of claim 5 wherein said divider is placed to lie outside the largest inscribed circle that can be constructed within said peripheral wall.

7. The grommet of claim 5 wherein said trailing portion of said peripheral wall has an outwardly extending flange mounted thereon, said flange being substantially planar.

8. The grommet of claim 5 wherein:

said peripheral wall has fittings for engaging said flangework;

said peripheral wall has a side portion between two of said fittings; and said two fittings stand proud of said side portion such that a straight edge placed across said two attachment fittings stands clear of the side portion lying therebetween.

9. A grommet, for use with a structural member having a web and an opening defined in the web, the opening having at least three smoothly radiused corners and a flanged lip adjacent thereto, the grommet being moveable in a forward direction for insertion into the opening, wherein said grommet comprises:

a peripheral wall having corner portions and side portions extending between said corner portions, said grommet having at least one passageway defined therethrough within said peripheral wall;

attachment fittings extending outwardly from at least three of said corner portions, each of said fittings having a seating element extending outwardly relative to said wall and an abutment element mounted forwardly of said seating element;

each of said seating elements being engageable to one of (a) said web, and (b) said flanged lip adjacent to a corner of said opening, each of said abutment elements being engageable to the other of (a) said web, and (b) said lip;

said abutment element being moveable to a deflected position to permit introduction of said grommet into said opening, and biased to move to an opposed position relative to its corresponding seating element;

said abutment and said seating element being co-operable to capture the web and the lip therebetween, and, when so captured, said abutment element in said opposed position is biased to discourage disengagement of said grommet from said opening.

10. The grommet of claim 9 wherein said side portions are substantially straight and each has an inside face; and said grommet has at least one partition wall lying inwardly of said peripheral wall to define at least one other passageway through said grommet.

11. The grommet of claim 10 wherein said partition wall lies outside the largest inscribed circle that can be constructed inside said peripheral wall.

12. The grommet of claim 10 wherein said grommet has a plurality of partition walls, said partition walls co-operating with said peripheral wall to define a plurality of passageways through said grommet.

13. The grommet of claim 9 wherein said side portions have respective leading portions and trailing portions; said seating elements extend outwardly from said corner portions adjacent said respective trailing portions and said abutment elements have a cam face oriented outwardly from said corner portions adjacent said respective leading portions.

14. The grommet of claim 13 wherein said corner portions comprise an archway having a pair of side columns and a spanning member, and said abutment element depends from said spanning member.

15. The grommet of claim 9 wherein said side portions extend linearly between said corner portions, and said corner portions have corner wall facings standing outwardly of said walls such that a straight edge laid across said corner wall facings stands clear of the side wall lying therebetween.

16. The grommet of claim 9 wherein at least one of said seating elements includes an outwardly cantilevered resilient member.

17. The grommet of claim 16 wherein said sidewalls have a trailing edge, and said trailing edge has an outwardly extending flange formed thereon.

18. The grommet of claim 9 wherein:

at least one of said seating elements is resilient;

said grommet is moveable to an inserted position relative to the structural member, in said inserted position said abutments are able to move to said opposed position and said resilient seating element is pre-loaded; and said pre-loaded resilient seating element is operable to exert a rearward force on said abutments.

19. The grommet of claim 9 wherein:

at least one of said seating elements is resilient, has a distal tip region that is cantilevered outwardly from said peripheral wall, and said distal tip region has a forwardly protruding formation thereon;

said grommet is moveable to an inserted position relative to the structural member, in said inserted position said abutments are able to move to said opposed position and said forwardly protruding formation engages said structural member to cause said distal tip region to deflect rearwardly relative to said peripheral wall, thereby applying a pre-load to said resilient seating element; and said pre-loaded resilient seating element is operable to exert a rearward force on said abutments, thereby squeezing the structural member between said abutments and said seating elements.

20. The grommet, of claim 9 wherein said seating elements include flanges cantilevered out from said peripheral wall, said flanges having a rearward face and a distal edge, and, when installed on said structural member, the rearward face of said cantilevered flange adjacent to said distal edge stands rearwardly relative to the remainder of said cantilevered flange.

21. The grommet of claim 9 wherein:

said peripheral wall has three planar side portions and three corner fitments;

an outwardly extending flange surmounts the trailing edge of each of said side portions, the trailing face of said flanges being co-planar;

said corner portions each include an archway having columns and an overspanning member, each of said columns mating with an end of an adjoining side portion and the inner face of said arch having a skirt mounted thereacross;

a resilient catch member is mounted to depend from said arch, said abutment being a rearwardly facing surface of said catch member, said catch member having an outwardly and rearwardly tapering cam surface, said cam surface being moveable to deflect said abutment inwardly;

said columns mounted to stand outwardly of said side wall portions to define a clearance rebate therebetween;

said seating element including a cantilevered flange extending outwardly about said corner portion and mating with the outward flanges of said trailing portions of said side wall portions, said cantilevered flange being resilient.

22. In combination, at least one longitudinally extending structural member and at least one grommet for use in co-operation therewith, wherein:

said structural member has a web, said web having a longitudinal edge, and a longitudinally extending main flange running along said edge;

said web has at least one opening therein, and flangework formed adjacent to said opening;

said grommet has a peripheral wall having an internal face defining a passageway, said wall having a leading portion that can be introduced into said opening in said web, and a trailing portion having at least one seating element extending outwardly of said wall to prevent passage of said trailing portion fully through said opening;

said grommet has at least one biased member having an abutment element biased to an opposed position relative to said seating element, said biased member being moveable to a deflected position during introduction of said trailing portion into said opening; and said grommet is moveable to engage said seating element against one of (a) said flangework and (b) said web, and, when so engaged said abutment element is moveable to said opposed position under the influence of said biased member, and, in said opposed position said abutment element discourages removal of said grommet from said opening;

said opening has a periphery defined in said web;

said peripheral wall has at least one side wall portion extending between a pair of sidewall ends;

one of said seating elements and one of said abutment elements are located at each end thereof; and, in an installed position of said grommet relative to said structural member, said side wall portion has a span free of contact with the periphery of said opening.

23. The combination of claim 22 wherein:

said peripheral wall has fittings for engaging said flangework;

said peripheral wall has a side portion between two of said fittings; and said two attachment fittings stand proud of said side portion such that a straight edge placed across said two attachment fittings stands clear of the side portion lying therebetween.

24. The combination of claim 22 wherein:

said structural member has a pair of opposed main flanges extending along opposite edges of said web;

a plurality of said openings are formed in said web, each of said openings having a base side portion extending parallel to one of said main flanges and a pair of side portions extending from said base side to meet at a smoothly radiused apex opposite said base side portion, said openings being arranged along said web in alternating side-by-side fashion with alternating diagonally extending struts formed in said web between pair of adjacent openings; and said flangework extends along said struts and said base side portions.

25. In combination, at least one longitudinally extending structural member and at least one grommet for use in co-operation therewith, wherein:

said structural member has a web, said web having a longitudinal edge, and a longitudinally extending main flange running along said edge;

said web has at least one opening therein, and flangework formed adjacent to said opening;

said grommet has a peripheral wall having an internal face defining a passageway, said wall having a leading portion that can be introduced into said opening in said web, and a trailing portion having at least one seating element extending outwardly of said wall to prevent passage of said trailing portion fully through said opening;

said grommet has at least one biased member having an abutment element biased to an opposed position relative to said seating element, said biased member being moveable to a deflected position during introduction of said trailing portion into said opening;

said grommet is moveable to engage said seating element against one of (a) said flangework and (b) said web, and, when so engaged said abutment element is moveable to said opposed position under the influence of said biased member, and, in said opposed position said abutment element discourages removal of said grommet from said opening;

said opening has a base side portion extending parallel to said main flange and a pair of side portions extending from said base side to meet at a smoothly radiused apex opposite said base side portion, said side portions and said base portion of said opening meet at smoothly radiused base corners;

said grommet engages said flangework at said base corners and at said apex;

said grommet has a base portion locatable adjacent said base portion of said opening, and a pair of side portions locatable adjacent to said side portions of said opening; and said base portion and said side portions of said grommet meet at respective attachment fittings that seat in said corners and said apex of said opening.

26. The combination of claim 25 wherein said grommet has a divider extending internally of said peripheral wall to define a second passage therewithin.

27. The combination of claim 25 wherein said flangework forms a continuous peripheral lip around said opening.

28. The combination of claim 25 wherein said apex has a larger radius of curvature than either of said base corners.

29. The combination of claim 25 wherein:

said web lies in a web plane;

portion of said flangework extend about said corners and said apex of said openings;

and said portions of said flangework have respective distal edges formed out of the plane of said web at a tapered angle;

said opening having an entrance at the plane of the web and an exit adjacent said distal edges; and said entrance of said opening at the plane of the web is wider than the exit of said opening adjacent said distal edges, said leading portion of said grommet being insertable along a direction running from said entrance toward said exit of said opening.

30. The combination of claim 29 wherein said attachment fittings have column members shaped to conform to said flangework at said corners and at said apex.

31. The combination of claim 29 wherein:

each of said attachment fittings includes one of said abutments, one of said seating elements has a pair of said column members and an overspanning member attached thereto adjacent the leading portion of said grommet;

each said attachment fitting has an arm depending from said overspanning member, said arm having said abutment formed thereon;

said arm having an outwardly facing cam member engageable with the taper of said flangework to cause said abutment to deflect; and in said opposed position said abutment engages said distal edge of said flangework.

32. The combination of claim 31 wherein each of said seating elements has an outwardly extending resilient wing, said resilient wing has an interface member for engaging said web, and said resilient member is operable to exert a rearward force on said abutment when said grommet is engaged with said structural element.

33. The combination of claim 25 wherein said grommet has at least one partition wall lying inwardly of said peripheral wall to define at least one other passageway through said grommet.

34. The combination of claim 25 wherein:

said peripheral wall has a side portion between two of said attachment fittings; and said two attachment fittings stand proud of said side portion such that a straight edge placed across said two attachment fittings stands clear of the side portion lying therebetween.

35. The combination of claim 25 wherein said grommet has at least one partition wall lying inwardly of said peripheral wall to define at least one other passageway through said grommet.

36. A kit comprising at least one sheet metal structural member and at least one grommet for use in co-operation therewith, wherein:

said sheet metal structural member has a pair of opposed, spaced apart, parallel main flanges and a web extending therebetween, said web having an outer face lying predominantly in a web plane and an inner face lying to one side thereof, said main flanges extending away from said web plane to give said sheet metal structural member a C-shaped appearance when viewed from one end thereof;

said web has a plurality of triangular openings formed therein in an alternating arrangement, and a plurality of alternating, flanged diagonal struts formed between adjacent pairs of said openings, said openings having smoothly radiused corners;

said web has lip flangework formed therein adjacent each said opening, said lip flangework standing proud of said inner face of said web;

said grommet has a peripheral wall having an internal face defining a passageway, said wall having a leading portion that can be introduced into one of said openings in said web, and a trailing portion having three seating elements extending outwardly of said wall to engage said structural member at three locations spaced about one of said triangular openings to prevent passage of said trailing portion fully through said one opening;

said grommet has three biased members, each biased member having an abutment surface biased to an opposed position relative to a respective one of said seating elements, said biased elements each being moveable to a deflected position during introduction of said trailing portion into said one opening; and one of said abutment surfaces and one of said seating elements define between them a capture depth at least great enough to capture said lip flangework and said outer face when said seating elements engage said sheet metal structural member and said abutment surfaces move to said opposed position.

37. The kit of claim 36 wherein said lip flangework includes a continuous flange extending about said one opening.

38. The kit of claim 36 wherein said three seating elements and three biased members are spaced about said peripheral wall in positions to engage said sheet metal structural member adjacent said smoothly radiused corners of said opening.

39. The kit of claim 36 wherein:

portions of said flangework extend about the corners and apex of said opening;

said portions of said flangework have respective distal edges formed out of said web plane at a tapered angle such that said opening is wider at the plane of the web than adjacent said distal edges, said leading portion being moveable along an insertion direction running from said entrance toward said exit of said opening; and said grommet has column members locatable in said corners and said apex of said opening, and said column members conform to said flangework at said corners and at said apex.

40. The kit of claim 36 wherein:

portions of said flangework extend about said corners and said apex of said opening;

said portions of said flangework have respective distal edges formed out of the web plane at a tapered angle such that said opening is wider at the web plane than adjacent said distal edges, said grommet includes attachment fittings engageable with said structural member adjacent said corners and said apex of said opening;

each of said attachment fittings includes one of said abutments, one of said seating elements, a pair of column members and an overspanning member attached thereto adjacent the leading portion of said grommet;

each said attachment fitting has an arm depending from said overspanning member, said arm having one of said abutments formed thereon, and having an outwardly facing cam member engageable with said flangework to cause said abutment to deflect; and in said opposed position said abutment engages said distal edge of said flangework.

41. The kit of claim 36 wherein:

each of said seating elements has an outwardly extending resilient wing;

said resilient wing has an interface member for engaging said web; and said resilient wing is operable to exert a rearward force on said abutment when said grommet is engaged with said structural member.

42. The kit of claim 36 wherein:

said peripheral wall has corner portions and straight side portions extending between said corner portions; and and said grommet has wall facings standing outwardly of said walls such that a straight edge laid across any two of said corner wall facings stands clear of the side portion lying therebetween.

43. The kit of claim 36 wherein said grommet has at least one partition wall lying inwardly of said peripheral wall to define at least one other passageway through said grommet.

44. In combination, at least one structural member that extends in a longitudinal direction and at least one grommet for use in co-operation therewith, wherein:

said structural member has a planar web, said web having a straight longitudinal edge, and a longitudinally extending main flange running along said straight longitudinal edge, said web having a plurality of alternating wide portions and narrow portions defining a longitudinal zig-zag edge;

said web has an opening defined in one of said wide portions, said opening having a base portion parallel to said straight longitudinal edge and a pair of side portions extending away from said base portion to meet at an apex, said opening having smoothly radiused corners between said base portion and said side portions, and at said apex;

said structural member has a lip flange formed about said opening, said lip flange having a distal edge lying away from said web;

said grommet has a peripheral wall having an internal face defining a passageway, said wall having a leading portion that can be introduced into said opening in said web, and a trailing portion having at least one seating element extending outwardly of said wall and engageable with said web to prevent passage of said trailing portion fully through said opening;

said grommet has at least one biased member having an abutment element biased to an opposed position relative to said seating element, said biased member being moveable to a deflected position during introduction of said trailing portion into said opening;

said grommet is moveable to engage said seating element with said web and said abutment element with said lip flange to capture said web, and, in said opposed position said abutment element discourages removal of said grommet from said opening;

said grommet has a first attachment fitting, a second attachment fitting, and a first portion of said peripheral wall extending between said first and second attachment fittings;

said first and second attachment fittings being engageable with the lip flange; and said attachment fittings standing proud of said first portion of said peripheral wall such that a straight edge placed across first and second fittings stands clear of the said first portion of said wall lying therebetween.

45. The combination of claim 44 wherein:

said grommet has second and third side portions of said peripheral wall and a third attachment fitting, each of said first, second and third portions of said peripheral wall lying between two attachment fittings;

said opening has a generally triangular shape, said peripheral wall has three straight side portions and three attachment fittings, one of said attachment fittings being matable to the apex, and the other two of said fittings being matable to the other two corners of said opening; and said attachment fittings standing proud of said side portions such that a straight edge placed across any two of said fittings stands clear of the portion of said peripheral wall lying therebetween.

46. The combination of claim 45 wherein said fittings each include one of said abutment and one of said seating elements, and said fittings act against said web and said lip flange at said corners of said opening.

47. The combination of claim 44 wherein:

said portions of said peripheral wall have trailing edges;

an outwardly extending flange surmounts the trailing edge of said portions of said peripheral wall, said flanges being co-planar;

said seating element includes a cantilevered flange extending outwardly about one of said attachment fittings and mating with said outwardly extending flanges, said cantilevered flange being resilient and having a portion engageable with said web;

said attachment fittings each include an archway having columns and an overspanning member, each of said columns mating with an end of an adjoining portion of said peripheral wall and the inner face of said arch having a skirt mounted thereacross;

a resilient catch member is mounted to depend from said arch, said abutment being a rearwardly facing surface of said catch member, said catch member having an outwardly and rearwardly tapering cam surface, said cam surface being moveable to deflect said abutment inwardly; and said grommet is movable to a seated position relative to said structural member, and, in said seated position, said resilient member bears against said web under a pre-load and carries and exerts a force to urge said abutment to bear against said distal edge of said lip flange.

\* \* \* \* \*